H. R. BOALS.
PLOW.
APPLICATION FILED APR. 7, 1913.
1,083,428.
Patented Jan. 6, 1914.
2 SHEETS—SHEET 1.
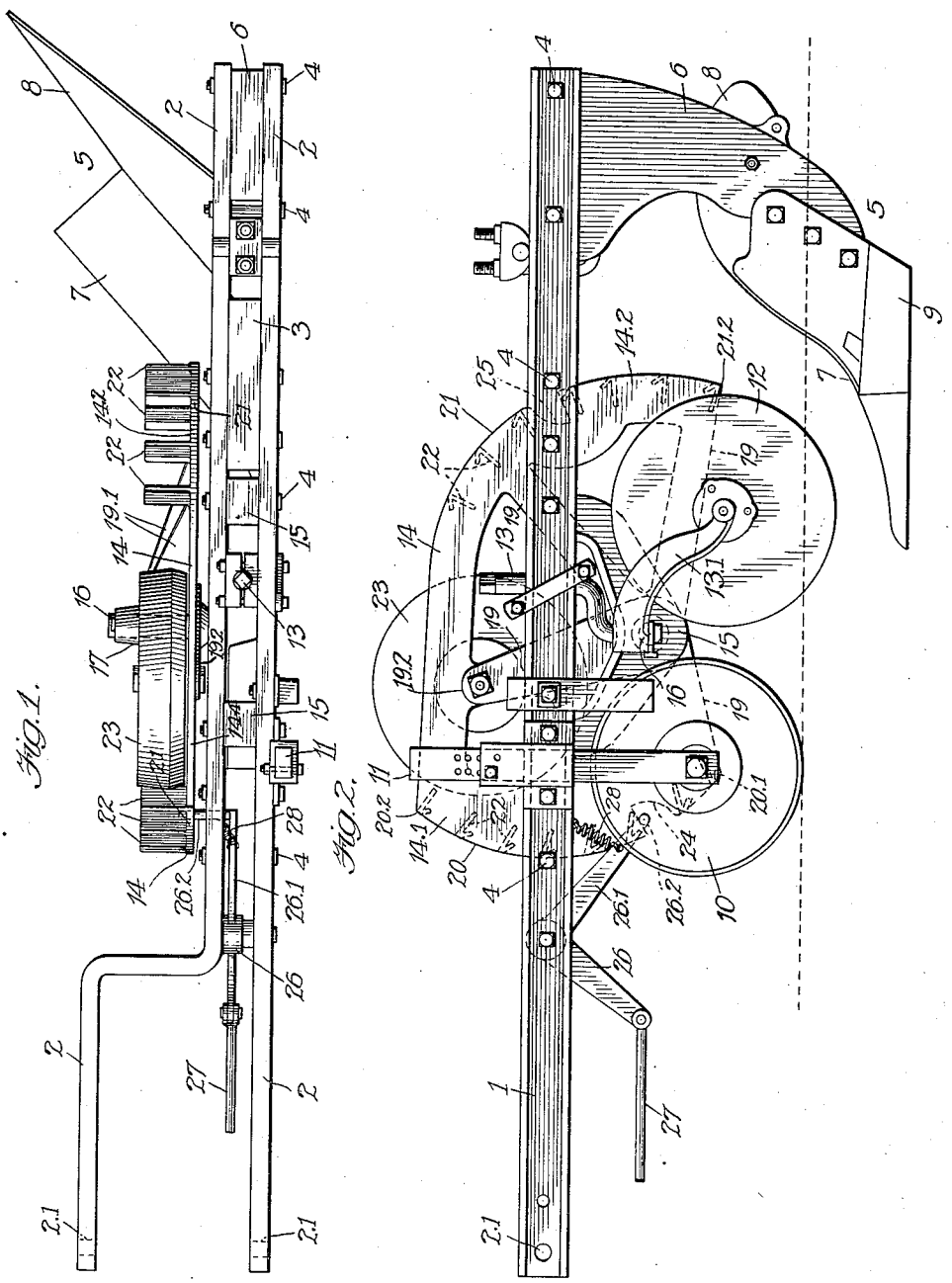

H. R. BOALS.
PLOW.
APPLICATION FILED APR. 7, 1913.
1,083,428.
Patented Jan. 6, 1914.
2 SHEETS—SHEET 2.
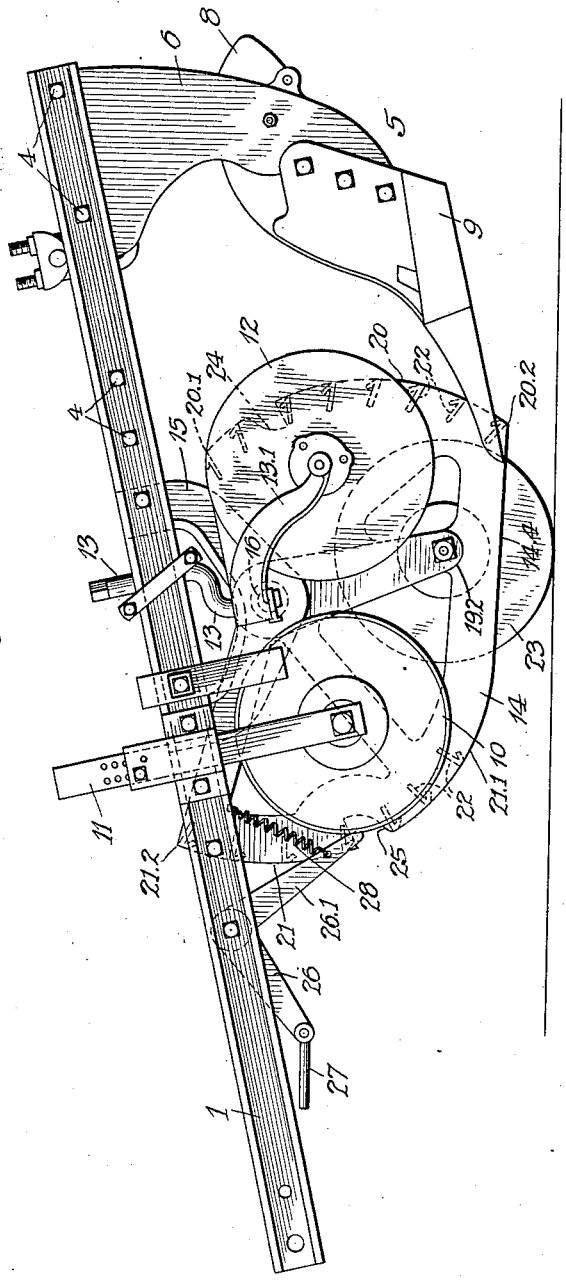
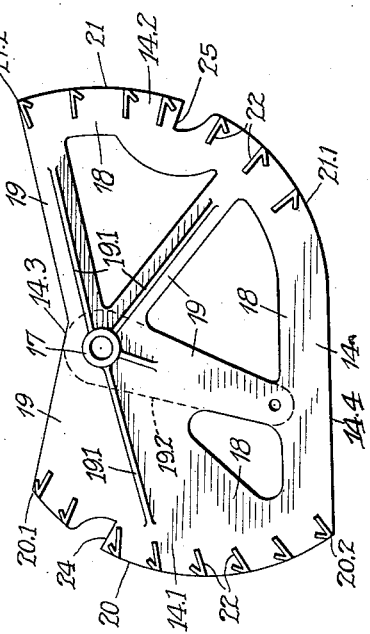

UNITED STATES PATENT OFFICE.

HARRY R. BOALS, OF LAPORTE, INDIANA.

PLOW.

1,083,428.  Specification of Letters Patent.  Patented Jan. 6, 1914.

Application filed April 7, 1913. Serial No. 759,388.

*To all whom it may concern:*

Be it known that I, HARRY R. BOALS, a citizen of the United States of America, and a resident of Laporte, county of Laporte, State of Indiana, have invented certain new and useful Improvements in Plows, of which the following is a specification.

Plows have heretofore been constructed and arranged for raising and lowering the plow body, as on riding plows and tractor gang plows, by means of hand levers, draft operated gears, or steam lifts, all comprising more or less complex and expensive mechanism or requiring heavy manual labor. Incident to these constructions it has been customary to provide one or more tread wheels arranged to remain always upon the ground and adapted to support the plow when raised, in combination with mechanism for transferring the weight of the plow thereto for throwing the body out of the ground when the end of the furrow has been reached.

The main objects of this invention are to provide a lift plow which shall be inherently automatic by draft of the tractor for lifting and lowering the body as the plow is drawn forward, simple in construction and operation, easily controllable from a distance, as from a tractor engine platform, easily adjustable for predetermining the depth of the furrow to be plowed, freely portable on its own supporting means when not set for plowing, and which shall be adapted for interchangeable connection in a gang designed for tractor service.

A specific construction embodying this invention is illustrated in the accompanying drawings, in which:

Figure 1 is a top plan view of a lift plow showing the beam and plow body lowered for use. Fig. 2 is a landside elevation of the plow shown in Fig. 1. Fig. 3 is a side elevation similar to Fig. 2, but with the frame and plow body raised. Fig. 4 is a reverse side elevation of the raising and lowering cam detached from the plow.

In the construction shown, a lift frame or plow beam 1, adapted to serve as a mounting for securing the otherwise separate parts of the plow in assembled relation, comprises a pair of longitudinal bars 2 formed and adapted, as by perforations 2.1, at their front ends for transverse hinge connection to the rear of the frame of a gang truck or platform (not shown). The bars 2 are of suitable rigid construction composed preferably of metal and formed relatively thin and flat and set on edge side by side, spaced slightly apart by certain of the plow parts including blocks 3 and clamped rigidly together by suitable fasteners as bolts 4. The beam 1 is widely forked at its front end, one of the bars 2 being formed with an off-set projecting laterally and forwardly at its front end, thus providing a more stable arrangement for hinge pivot connection to the said truck.

A plow body 5 is rigidly attached to the rearward portion of the beam 1 at or adjacent to the extreme end thereof, there being provided for this purpose a downwardly projecting rigid arm or frog 6 bolted to the beam 1 in clamped position between the frame bars 2, and adapted to receive for rigid mounting and assemblage at its lower end the usual plow body parts including the share 7, mold-board 8, and land-side 9.

Adjustable means for predetermining and maintaining the gage or depth of the furrow is provided consisting of a tread wheel 10, journaled on the lower end of a downwardly projecting bracket 11 adjustably and rigidly attached to the beam 1.

A suitable colter 12 is provided in front of the said plow body for cutting the sod. This is represented by a sharp disk 12 journaled on the lower end of a suitable support or bracket means vertically adjustable on the beam adjacent the plow bottom. This bracket preferably comprises a vertical upper shaft member 13 formed with an off-set of the character of a crank arm at its lower end and the upper end being adapted to be adjusted both vertically and rotatably and to be rigidly clamped to the beam in front of the frog 6, and a lower member 13.1 vertically journaled on the lower extremity of said off-set portion of the member 13 and inclining rearwardly to permit more or less lateral swinging movement of the rotary colter blade 12, as it cuts through the sod and works its way past stones and other obstructions.

Simple automatic means, connected for ready manual control and operatable directly by the draft of the tractive force, are provided for raising and lowering the rear end of the beam 1 and the plow body 5 secured thereto. An eccentric bearing member or cam 14 arranged and adapted to coact directly between the ground and the beam 1 for lifting and lowering action is provided for this purpose. This cam is suitably attached to the beam 1 in front of the plow body 5, as by means of a rigidly mounted bracket 15 to which the cam is journaled on a transversely disposed pivot 16. The said cam comprises a pivotal hub portion 17, a perimetric rim 18 disposed eccentrically about the hub, and radial spider or web means, as spokes 19 rigidly connecting said hub and rim for supporting the latter, said rim being formed with or having outwardly facing tread members 20 and 21 adapted to operatively engage the ground for forcibly rotating the cam. The spider or spoke member 19 is reinforced and braced by radial buttress members 19.1. One of the spokes directly connects the cam hub 17 and the point on the rim where the trundling wheel 23 is located. This spoke is strongly reinforced by a longitudinal rib 19.2 formed on the side opposite the said buttress members.

The cam 14 is oblong in shape and has a somewhat rectangular appearance in side elevation with convexly rounded ends 14.1 and 14.2 bearing the said tread sections 20 and 21, formed and arranged for raising and lowering the plow respectively as the cam is rotated by its rolling contact with the ground. The hub 17 is positioned at a point about midway of one side 14.3 but somewhat nearer the raising end 14.1. Each of the said rim tread sections is provided with a rough bearing surface preferably having a series of transverse ribs 22 projecting laterally from the rim proper, and adapted to engage the ground to prevent sliding thereon and to impart a turning moment to the cam when the bearing rim sections thereof are rotated into either of the ground engaging positions respectively.

The raising rim tread 20 is formed with its toe or initially engaging end 20.1 less remote from the hub 17 than its heel or finally engaging end 20.2, whereby the plow is gradually and evenly raised. The lowering rim tread 21 is arranged with its toe 21.1 and heel 21.2 substantially equidistant from the hub 17, but the heel end of the rim is continued through an arc of sufficient length to insure carrying the opposite end 20 of the cam upwardly and forwardly past its neutral or balancing point, so that gravity will become effective for continuing the rotation of the cam for a distance sufficient to raise the heel 21.2 clear of the ground. With respect to the hub, it will be seen that the cam is relatively deep on one side, namely, toward the edge 14.4 and very shallow or almost negligible on the opposite side.

A tread wheel 23 for trundling the plow freely over the ground or along the road is journaled to the said cam on its deep side at a point near the center of the edge 14.4 opposite from the hub 17, but somewhat toward the raising end 14.1. When the cam is rotated to its upward and substantially horizontal position, the said wheel 23 is carried upward away from the ground and above the cam hub, and by such rotation the beam and plow body are lowered for plowing. When the cam is rotated to its downward and substantially horizontal position, the wheel 23 is carried to its ground bearing position, slightly to the rear of the cam hub 17, thus raising the beam and plow body for free portability above the ground.

Automatic stop or locking means are provided for normally holding the cam in either its upward or downward position. To this end the cam is formed with a pair of radial ratchet notches 24 and 25 in the rim intermediate the length of the tread sections 20 and 21 respectively, and on the beam 1, in front of the cam, is pivoted a dog member in the form of a bell crank lever 26 arranged for one arm 26.1 to engage the said notches successively as they are carried forwardly and downwardly within its reach, its other arm being pivotally connected to a controlling link 27 extending forwardly to the operator's position. The free end of the arm 26.1 is provided with a transverse stud 26.2 adapted to engage the said notches. Resilient means adapted to urge the arm 26.1 rearwardly into engagement with the notches is provided, consisting of a tension spring 28 stretched rearwardly from the free end of the arm 26.1 to suitable fastening means on the beam 1. By this arrangement the dog or arm 26.1 automatically engages each of the said notches in turn as they pass downwardly, and locks the cam as it rotates always forwardly (counterclockwise on Figs. 2 and 3) into either its upward or downward position. When the operator pulls the link 27 the dog 26.2 is released from the cam which immediately begins automatically to rotate, due either to the greater weight of the forward end of the cam and trundle wheel mounted thereon when in its upward position, or to the normal running position of the said wheel being slightly back of the hub center when the cam is in its downward position with the wheel bearing on the ground. In this latter case the initial turning moment on the cam, due to the weight of the plow, is augmented by the tractive force pulling the plow forward. Whenever the cam is released a slight turning thereof brings the ribbed bearing portion of one rim section or the other into engagement with the ground, whereupon the tractive force alone continues the rotation until the operation of raising or lowering is completed, after which the cam soon passes the critical or balancing point and is shortly thereafter arrested by the dog 26.1 and held locked until again released by the operator.

Assuming that the plow is raised for traveling on the road, as illustrated in Fig. 3, in order to lower the plow the control link is pulled thus releasing the cam which, urged by the upward bearing thrust on its rearward portion, immediately begins to rotate on its pivot, the tread section 21 engaging the ground and the wheel 23 being carried upwardly and forwardly. The cam in turning through substantially one hundred and eighty degrees gradually lowers the plow to its normal operating position for turning a furrow, the depth of entry being limited by the guide wheel 10 which has been previously set for predetermining the depth of the furrow, and the cam rising clear of the ground and being engaged and locked by the dog 26.2 at notch 24.

When the plow is to be raised the control link is again operated, thus again releasing the cam which will be caused by gravity acting on the heavier or forward end to drop downwardly in front and engage the ground by means of its lifting tread section 20, and as rotation is continued the cam will operate to raise the plow by virtue of the peculiar shape of the cam. When the cam reaches its balancing position on the heel 20.2 of the lifting tread it tips forward and throws the load on the wheel 23, and the dog 26.2 engages the notch 25 and locks the cam with the wheel 23 in trundling position just back of the hub 17.

Although but one specific embodiment of this invention has been herein shown and described, it will be understood that numerous details of the construction shown may be altered or omitted without departing from the spirit of this invention as defined by the following claims.

I claim:

1. In a plow of the character described, lifting and lowering means comprising a pivotally mounted member formed and arranged for tractive bearing upon the ground and adapted through such tractive bearing for lifting the plow body when rotated through one certain angle, and for lowering it when rotated through another certain angle.

2. In a plow of the character described, lifting and lowering means comprising a pivotally mounted cam adapted and arranged for perimetric bearing engagement with the ground for lifting the plow when rotated through one certain angle and for carrying the plow in its raised position, and for lowering it when rotated through another certain angle.

3. In a lift plow, a vertically and longitudinally disposed and transversely journaled cam adapted for lifting and lowering the plow, said cam comprising a hub, a rim, and support means radiating from the hub to the rim, said rim having transverse ribs adapted to engage the ground for rotating the cam when the plow moves forward.

4. In a lift plow, a cam journaled to an intermediate portion of the beam for lifting and lowering same, said cam having a deep portion on one side and a shallow portion on the opposite side, said deep portion being adapted when rotated to a downward position to support the plow and carry the plow body free from the ground, and said shallow portion being adapted when rotated to face downward to pass freely over the ground without contact therewith.

5. In a lift plow, a cam of oblong shape having a pivotal hub positioned intermediately of the ends, and a tread rim section on each end adapted to engage the ground.

6. In a lift plow, a cam of oblong shape journaled on a fixed pivot adjacent one side of the cam and intermediate of the ends thereof, and the ends each being provided with a tread rim and outstanding ribs adapted for engaging the ground to prevent slippage.

7. In a lift plow, a cam of oblong shape having a hub journaled on a fixed pivot, said hub being positioned adjacent to one side of said cam and intermediate of the ends, and a tread rim section on each end adapted to engage the ground, one of said rim sections being shaped to cause raising of the hub as the cam rolls forwardly on said rim.

8. In a lift plow, a tread cam of oblong shape having a pivot hub on one side, a curved tread rim on one end of the cam arranged with one end nearer the hub than the other, and another tread rim on the opposite end arranged substantially equidistant from the hub throughout, substantially as and for the purpose set forth.

9. In a lift plow in combination, a tread cam adapted for both lifting and lowering the plow, and a tread wheel gage member mounted for vertical adjustment to determine the depth of furrow.

10. In a device of the class described, an oblong cam having a rim formed with a ground tread at each end, and a pivotal hub adjacent to one side, in combination with a wheel mounted adjacent to the side opposite said hub with its rim projecting beyond the adjacent edge of the cam.

11. In a lift plow in combination, a cam journaled on the beam and adapted to raise and lower the plow, a gage attached to the beam for limiting the lowering to a predetermined degree, and a wheel journaled upon and adjacent to one edge of said cam for trundling the plow freely over the ground when the cam has lifted the plow.

12. In a lift plow, the combination of an oblong cam having a fixed journal bearing on the plow at one side of the cam and intermediate of its ends, in combination with a trundle wheel journaled to the opposite side of the cam, the ends of said cam being adapted to engage the ground and being suitably curved for raising and lowering the plow respectively as the cam rotates, and means for locking the cam in either raised or lowered positions.

13. In a lift plow, a tread cam journaled to the plow beam and formed for raising and lowering the plow, in combination with a dog pivoted to the beam and adapted by ratchet arrangement to automatically lock the cam in certain definite positions, and means adapted for manually releasing the dog.

14. In a lift plow, a beam and a plow body attached thereto in combination with a longitudinal vertical cam adapted and arranged for lifting and lowering the beam, said cam comprising a hub adapted for pivotal mounting on the beam, a radially disposed substantially flat portion on said hub, and a perimetric rim bordering said flat portion, certain portions of said rim being adapted to operatively engage the ground for rotating the cam when the plow is drawn forward.

15. In a lift plow, the combination of a beam adapted to receive tractive force for drawing the plow and to prevent tipping when the plow is raised, a plow body attached to said beam and adapted to turn a furrow, a cam adapted and arranged to lift and lower said beam and plow body with respect to the ground for controlling the operation of the plow, a gage wheel arranged to limit the lowering of the plow body according to a predetermined depth of furrow, a trundle wheel arranged to automatically take up the support of the plow when the same is raised free from the ground, and means arranged and adapted for manually controlling the said lifting and lowering means.

16. In a lift plow, the combination of a beam arranged at its front end for flexible coupling to a tractive means, a plow body rigidly attached to the rearward portion of said beam and adapted to turn a furrow, a cam member disposed longitudinally and vertically with respect to said beam and transversely pivoted thereto for rotation at a point rearward of the front end, said cam being adapted to lift the plow body when rotated through one portion of its path to lower it when rotated through another portion of its path and to swing clear of the ground when the plow is lowered, gage means adapted for adjustable setting to limit the lowering of the plow body according to a predetermined depth of furrow, trundle means on the cam for supporting the plow when raised free from the ground for portability, and means for manual control of said cam.

Signed at Laporte this 2nd day of April 1913.

HARRY R. BOALS.

Witnesses:
H. W. WORDEN,
F. E. FREEMAN.

---

Copies of this patent may be obtained for five cents each, by addressing the "Commissioner of Patents, Washington, D. C."